March 3, 1936. W. E. DUNN 2,032,529
OPERATION OF STORAGE BATTERIES
Filed Feb. 2, 1933
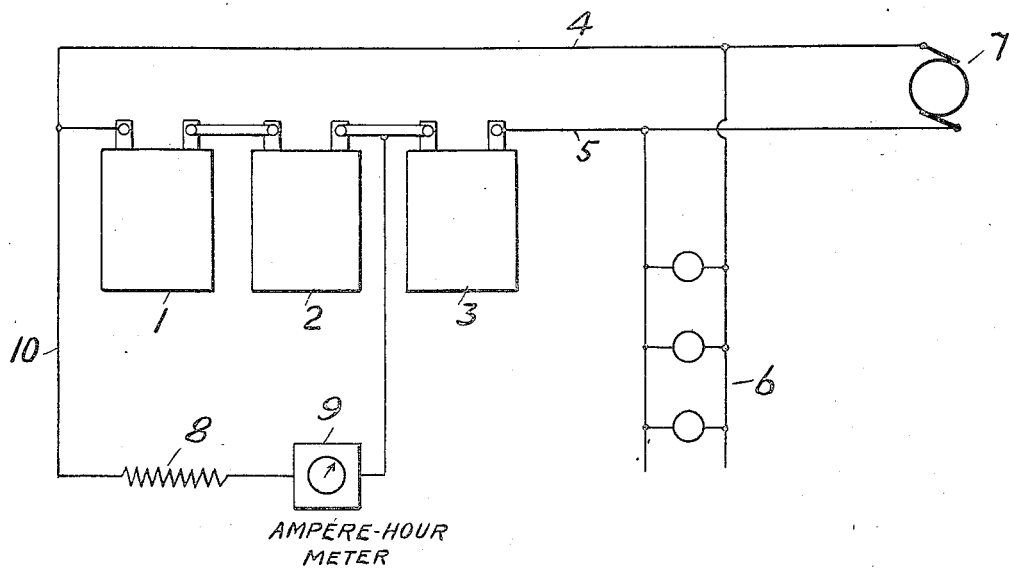
INVENTOR
William E. Dunn
BY
Augustus B. Stoughton
ATTORNEY.
WITNESS:

Patented Mar. 3, 1936

2,032,529

UNITED STATES PATENT OFFICE 2,032,529

OPERATION OF STORAGE BATTERIES

William E. Dunn, Wilmette, Ill., assignor to The Electric Storage Battery Company, Philadelphia, Pa., a corporation of New Jersey Application February 2, 1933, Serial No. 654,784

4 Claims. (Cl. 175—183)

The principal object of the present invention is to provide for determining the average voltage maintained across a cell or battery over a definite period of time in a convenient manner and by means of simple apparatus. Such information is useful and important in the operation of a battery especially where the battery is maintained continuously floating on a direct current circuit. In such case it is desirable to keep the average voltage per cell at a certain value in order to keep the battery in a fully charged condition without involving an excessive amount of overcharge. If the average floating voltage is too high, the battery will be overcharged and the life of the plates will be reduced. If the average floating voltage is too low, the negative pole plates are liable to become sulphated.

Generally stated, the invention comprises the improvements to be presently described and finally claimed. In the following description reference will be made to the accompanying drawing in which the single figure is a diagrammatic view illustrative of the invention.

Referring to the drawing, 9 is an ampere hour meter of very small capacity and it is connected across one or more cells 1, 2, 3, or across the entire battery through a fixed resistance 8 of very high value so that current taken from the cells or the battery is exceedingly small, for example, in the order of a few milliamperes. As shown the resistance 8 and the ampere hour meter 9 are connected in series across the cells 1 and 2. The function of the ampere hour meter 9 is to record accurately this small amount of current, and it must be designed to accomplish that purpose. The current passing through the ampere hour meter is proportional to the voltage of the cells to which it is connected and therefore the ampere hours registered by this meter in a given length of time are proportional to the average voltage during that time. As a matter of convenience the scale of the ampere hour meter 9 may be so designed that the reading obtained during a given number of days divided by the number of days will be equal to the average voltage during that time. The three cells of battery are shown as connected in series across the circuit 4—5 to which is connected a load circuit 6, and a source of charging current 7. These operating circuits may be varied in any way to suit requirements and form no part of the invention. As has been said the total quantity of electricity passing through the circuit 10 in a given time is registered by the ampere hour meter, and the amount thus registered divided by the time will give the average value of current flowing during that time. This value multiplied by the known resistance of the circuit gives the average voltage across the two cells 1 and 2. The drawing shows the ampere hour meter circuit connected across two cells but it may be connected across any number of cells or across the entire battery. It may be remarked that where the voltage across the battery is variable, due for example to variations in the charging source or in the load, it is impossible to determine the average voltage with an ordinary volt meter without taking frequent voltage readings requiring a great deal of personal attention. Even where such readings are taken at reasonably frequent intervals, the variations of voltage which may occur between successive readings will not be recorded, thus introducing error into the results obtained. The present invention permits an accurate value of the average voltage to be determined by two readings of the ampere hour meter taken respectively at the beginning and the end of a known period of time.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. In the operation of a battery continuously floating on a direct current circuit and for determining the average battery voltage maintained over a period of time, the combination of an ampere hour meter of small capacity in respect to the capacity of the cells, a fixed resistance of very high value in respect to the capacity of the cells, and a circuit connection connecting the resistance and ampere hour meter in series across cells of the battery and passing through the ampere hour meter current of the order of a few milliamperes and proportional to the voltage of the cells across which the meter is connected, whereby the registration of the meter in a given length of time is indicative of the average voltage during that time.

2. Means for determining the average battery voltage maintained for a period of time comprising the combination of an ampere hour meter of small capacity in respect to the capacity of the cells and a fixed resistance of very high value in respect to the capacity of the cells connected in series across cells of the battery.

3. In the operation of a battery continuously floating on a direct current circuit and for determining the average battery voltage maintained over a period of time, the combination of an ampere hour meter of small capacity in respect to the capacity of the cells, a fixed resistance of very high value in respect to the capacity of the cells, and a circuit connection connecting the resistance and the ampere hour meter in series across the cells of the battery and passing through the ampere hour meter current of the order of a few milliamperes and proportional to the voltage of the cells across which the meter is connected, whereby the registration of the meter in a given length of time is indicative of the average voltage during that time.

4. The method of determining the average battery voltage maintained across battery cells during a period of time which consists in continuously passing through a fixed resistance circuit across the cell terminals current of the order of a few milliamperes and proportional to the voltage of the cells between whose terminals the current passes, and determining the average voltage during the period of time by measuring the total quantity of current in ampere hours passed during that period of time, multiplying this quantity by the value of the resistance in ohms and dividing by the time expressed in hours.

WILLIAM E. DUNN.